(12) United States Patent
Gong et al.

(10) Patent No.: US 9,770,884 B2
(45) Date of Patent: *Sep. 26, 2017

(54) METAL-RESIN COMPOSITE AND METHOD FOR PRODUCING THE SAME

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Qing Gong, Guangdong (CN); Xiong Zhang, Guangdong (CN); Yihu Zhang, Guangdong (CN); Wei Zhou, Guangdong (CN)

(73) Assignees: SHENZHEN BYD AUTO R&D COMPANY LIMITED, Shenzhen (CN); BYD COMPANY LIMITED, Shenzhen (CN)

( * ) Notice: Subject to any disclaimer, the term of this patent is extended or adjusted under 35 U.S.C. 154(b) by 211 days.

This patent is subject to a terminal disclaimer.

(21) Appl. No.: 14/466,920

(22) Filed: Aug. 22, 2014

(65) Prior Publication Data

US 2014/0363657 A1    Dec. 11, 2014

Related U.S. Application Data

(63) Continuation of application No. PCT/CN2012/082025, filed on Sep. 26, 2012.

(30) Foreign Application Priority Data

Feb. 24, 2012 (CN) .......................... 2012 1 0043637

(51) Int. Cl.

| | |
|---|---|
| B32B 5/18 | (2006.01) |
| B32B 15/085 | (2006.01) |
| B29C 45/14 | (2006.01) |
| B32B 9/00 | (2006.01) |
| B32B 15/04 | (2006.01) |
| B32B 27/32 | (2006.01) |
| B32B 27/28 | (2006.01) |

(52) U.S. Cl.
CPC .......... *B32B 5/18* (2013.01); *B29C 45/14311* (2013.01); *B29C 45/14811* (2013.01); *B32B 9/005* (2013.01); *B32B 15/04* (2013.01); *B32B 15/085* (2013.01); *B32B 27/286* (2013.01); *B32B 27/32* (2013.01); *B29C 45/14778* (2013.01); *B29C 2045/14803* (2013.01); *B32B 2250/03* (2013.01); *B32B 2270/00* (2013.01); *Y10T 428/249956* (2015.04)

(58) Field of Classification Search
None
See application file for complete search history.

(56) References Cited

U.S. PATENT DOCUMENTS

| | | |
|---|---|---|
| 4,499,237 A | 2/1985 | Tracke |
| 4,687,551 A * | 8/1987 | Furneaux ........... B01D 67/0065 205/50 |
| 5,021,504 A | 6/1991 | Fujita |
| 5,332,780 A | 7/1994 | Kitazawa et al. |
| 5,602,200 A | 2/1997 | Wissmann |
| 6,495,225 B1 * | 12/2002 | Nakajima ................. C08L 1/02 428/35.6 |
| 6,804,081 B2 | 10/2004 | Den et al. |
| 7,841,577 B2 | 11/2010 | Yamaguchi et al. |
| 7,879,734 B2 | 2/2011 | Fukutani et al. |
| 8,703,272 B2 * | 4/2014 | Naritomi ........... B29C 45/14311 264/264 |
| 2001/0036559 A1 | 11/2001 | Haack et al. |
| 2002/0033108 A1 | 3/2002 | Akiyama et al. |
| 2002/0040888 A1 | 4/2002 | Marczak et al. |
| 2003/0001274 A1 | 1/2003 | Den et al. |
| 2003/0180555 A1 | 9/2003 | Wakayama et al. |
| 2004/0013931 A1 | 1/2004 | Takamura et al. |
| 2004/0062943 A1 | 4/2004 | Naritomi et al. |
| 2004/0142503 A1 | 7/2004 | Lee et al. |
| 2004/0229031 A1 | 11/2004 | Gell et al. |
| 2006/0046602 A1 * | 3/2006 | Kang ..................... B82Y 10/00 445/50 |
| 2006/0054589 A1 | 3/2006 | Omori et al. |
| 2006/0055084 A1 | 3/2006 | Yamaguchi et al. |
| 2006/0088680 A1 | 4/2006 | Kitahara |
| 2006/0127684 A1 | 6/2006 | Naritomi et al. |

(Continued)

FOREIGN PATENT DOCUMENTS

| | | |
|---|---|---|
| CN | 1190062 A | 8/1998 |
| CN | 1492804 A | 4/2004 |
| CN | 1639387 A | 7/2005 |
| CN | 1706992 A | 12/2005 |
| CN | 1711170 A | 12/2005 |
| CN | 1717323 A | 1/2006 |
| CN | 101010452 A | 8/2007 |
| CN | 101248219 A | 8/2008 |
| CN | 101313087 A | 11/2008 |
| CN | 101341023 A | 1/2009 |

(Continued)

OTHER PUBLICATIONS

PCT International Search Report mailed Jan. 3, 2013, issued in International Application No. PCT/CN2012/082025 (4 pages).
PCT International Search Report mailed Nov. 29, 2012, issued in International Application No. PCT/CN2012/078830 (4 pages).
PCT International Search Report mailed Dec. 13, 2012, issued in International Application No. PCT/CN2012/078832 (4 pages).
PCT International Search Report mailed Jan. 3, 2013, issued in International Application No. PCT/CN2012/082029 (4 pages).
PCT International Search Report mailed Jan. 3, 2013, issued in International Application No. PCT/CN2012/082031 (4 pages).

(Continued)

*Primary Examiner* — Shamim Ahmed

(57) ABSTRACT

A metal-resin composite and method for producing the same are provided. The method comprises: A) forming nanopores in at least a part of a surface of a metal sheet; and B) injection molding a thermoplastic resin directly on the surface of the metal sheet. The thermoplastic resin includes a main resin and a polyolefin resin. The main resin includes a mixture of polyphenylene ether and polyphenylene sulfide. And the polyolefin resin has a melting point of about 65° C. to about 105° C.

12 Claims, No Drawings

(56) References Cited

U.S. PATENT DOCUMENTS

| | | |
|---|---|---|
| 2006/0257624 A1 | 11/2006 | Naritomi et al. |
| 2007/0096359 A1 | 5/2007 | Torfs |
| 2007/0116934 A1 | 5/2007 | Miller |
| 2007/0196637 A1 | 8/2007 | Good et al. |
| 2008/0057336 A1 | 3/2008 | Kurokawa et al. |
| 2008/0081867 A1 | 4/2008 | Sakata et al. |
| 2008/0102404 A1 | 5/2008 | Tashiro et al. |
| 2009/0017242 A1 | 1/2009 | Weber et al. |
| 2009/0075156 A1 | 3/2009 | Long et al. |
| 2009/0155522 A1 | 6/2009 | Raghavendran |
| 2009/0202840 A1 | 8/2009 | Griebel et al. |
| 2009/0274889 A1 | 11/2009 | Iwahashi et al. |
| 2009/0280296 A1 | 11/2009 | Naritomi et al. |
| 2009/0304970 A1* | 12/2009 | Imaizumi ............ B29C 45/062 428/38 |
| 2010/0018025 A1 | 1/2010 | Naritomi et al. |
| 2010/0021718 A1* | 1/2010 | Vos ..................... B32B 5/26 428/315.9 |
| 2010/0028602 A1 | 2/2010 | Naritomi et al. |
| 2010/0177392 A1 | 7/2010 | Masuda et al. |
| 2010/0189958 A1 | 7/2010 | Naritomi et al. |
| 2010/0190029 A1 | 7/2010 | Ueki |
| 2010/0218827 A1 | 9/2010 | Aono et al. |
| 2010/0255732 A1* | 10/2010 | Kohmura .......... B29C 45/14311 439/733.1 |
| 2010/0283165 A1 | 11/2010 | Ihara |
| 2010/0304083 A1 | 12/2010 | Naritomi et al. |
| 2010/0316878 A1 | 12/2010 | Naritomi et al. |
| 2011/0008644 A1 | 1/2011 | Naritomi et al. |
| 2011/0111214 A1 | 5/2011 | Endo et al. |
| 2011/0165342 A1 | 7/2011 | Imai et al. |
| 2011/0250377 A1 | 10/2011 | Qin |
| 2011/0281135 A1 | 11/2011 | Gong et al. |
| 2011/0297549 A1 | 12/2011 | Chen et al. |
| 2011/0305893 A1 | 12/2011 | Chang et al. |
| 2011/0318585 A1 | 12/2011 | Su et al. |
| 2012/0015186 A1* | 1/2012 | Honma ................ B29C 45/0001 428/375 |
| 2012/0039066 A1 | 2/2012 | Hatanaka et al. |
| 2012/0043689 A1 | 2/2012 | Chang et al. |
| 2012/0094108 A1 | 4/2012 | Chang et al. |
| 2012/0168990 A1* | 7/2012 | Kuwahara ............ B29C 33/08 264/404 |
| 2012/0213971 A1 | 8/2012 | Ihara |
| 2012/0237755 A1 | 9/2012 | Chang et al. |
| 2013/0043689 A1 | 2/2013 | Tai et al. |
| 2013/0078423 A1 | 3/2013 | Sutou et al. |
| 2013/0242487 A1* | 9/2013 | Fujioka ............ B29C 45/14221 361/679.01 |
| 2014/0360974 A1 | 12/2014 | Sun et al. |
| 2014/0363623 A1 | 12/2014 | Sun et al. |
| 2014/0363631 A1 | 12/2014 | Gong et al. |
| 2014/0363658 A1 | 12/2014 | Sun et al. |
| 2014/0363659 A1 | 12/2014 | Sun et al. |
| 2014/0363660 A1 | 12/2014 | Gong et al. |
| 2014/0363686 A1 | 12/2014 | Sun et al. |

FOREIGN PATENT DOCUMENTS

| | | |
|---|---|---|
| CN | 101396888 A | 4/2009 |
| CN | 101409229 A | 4/2009 |
| CN | 101547779 A | 9/2009 |
| CN | 101568420 A | 10/2009 |
| CN | 101578170 A | 11/2009 |
| CN | 101607446 A | 12/2009 |
| CN | 101623933 A | 1/2010 |
| CN | 101640169 A | 2/2010 |
| CN | 101687390 A | 3/2010 |
| CN | 101743111 A | 6/2010 |
| CN | 101795845 A | 8/2010 |
| CN | 101802263 A | 8/2010 |
| CN | 101875251 A | 11/2010 |
| CN | 101913065 A | 12/2010 |
| CN | 101937935 A | 1/2011 |
| CN | 101941271 A | 1/2011 |
| CN | 101988609 A | 3/2011 |
| CN | 102021569 A | 4/2011 |
| CN | 102039700 A | 5/2011 |
| CN | 102056724 A | 5/2011 |
| CN | 102229266 A | 11/2011 |
| CN | 102234803 A | 11/2011 |
| CN | 102268183 A | 12/2011 |
| CN | 102345127 A | 2/2012 |
| CN | 102371679 A | 3/2012 |
| CN | 102441962 A | 5/2012 |
| CN | 102442028 A | 5/2012 |
| CN | 102666921 A | 9/2012 |
| CN | 102776466 A | 11/2012 |
| CN | 103036086 A | 4/2013 |
| EP | 1643546 A2 | 4/2006 |
| EP | 1958763 A1 | 8/2008 |
| EP | 2031099 A1 | 3/2009 |
| EP | 2154203 A1 | 2/2010 |
| EP | 2221398 A1 | 8/2010 |
| EP | 2426237 A1 | 3/2012 |
| JP | S50-39759 A | 4/1975 |
| JP | S59211576 A | 11/1984 |
| JP | 61-106796 A | 5/1986 |
| JP | H06272085 A | 9/1994 |
| JP | 2000144491 A | 5/2000 |
| JP | 2001254009 A | 9/2001 |
| JP | 2001315159 A | 11/2001 |
| JP | 2002225164 A | 8/2002 |
| JP | 2004-055248 A | 2/2004 |
| JP | 2004249681 A | 9/2004 |
| JP | 2005-342895 A | 12/2005 |
| JP | 2006-001216 A | 1/2006 |
| JP | 2006027018 A | 2/2006 |
| JP | 2007-16123 A * | 1/2007 |
| JP | 2007050630 A | 3/2007 |
| JP | 2007203585 A | 8/2007 |
| JP | 2008091933 A | 4/2008 |
| JP | 2008095132 A | 4/2008 |
| JP | 2006124827 A | 5/2008 |
| JP | 2008138288 A | 6/2008 |
| JP | 2008156381 A | 7/2008 |
| JP | 2008243412 A | 10/2008 |
| JP | 2009041008 A | 2/2009 |
| JP | 2009267334 A | 11/2009 |
| JP | 2010-000679 A | 1/2010 |
| JP | 2010-030177 A | 2/2010 |
| JP | 2010-064496 A | 3/2010 |
| JP | 2010110931 | 5/2010 |
| JP | 2011021260 A | 2/2011 |
| JP | 2011168017 A | 9/2011 |
| JP | 2011174133 A | 9/2011 |
| JP | 2011194594 A | 10/2011 |
| JP | 2011218603 A | 11/2011 |
| JP | 2012006392 A | 1/2012 |
| JP | 2012193448 A | 10/2012 |
| KR | 20060104540 A | 10/2006 |
| KR | 20080062814 A | 7/2008 |
| KR | 20090027317 A | 3/2009 |
| KR | 20090089852 A | 8/2009 |
| WO | WO 01/38444 A1 | 5/2001 |
| WO | WO 2004/048087 A1 | 6/2004 |
| WO | 2005109984 A2 | 11/2005 |
| WO | 2007066742 A1 | 6/2007 |
| WO | WO 2009/078377 A1 | 6/2009 |
| WO | WO 2010/073636 A1 | 7/2010 |
| WO | WO 2011/055757 A1 | 5/2011 |
| WO | WO 2011/071102 A1 | 6/2011 |
| WO | WO 2011/123790 A1 | 10/2011 |
| WO | 2013123769 A1 | 8/2013 |
| WO | WO 2013/123754 A1 | 8/2013 |
| WO | WO 2013/123756 A1 | 8/2013 |
| WO | WO 2013/123769 A1 | 8/2013 |
| WO | WO 2013/123770 A1 | 8/2013 |
| WO | WO 2013/123771 A1 | 8/2013 |
| WO | WO 2013/123772 A1 | 8/2013 |
| WO | WO 2013/123773 A1 | 8/2013 |
| WO | WO 2013/123898 A1 | 8/2013 |

(56) References Cited

FOREIGN PATENT DOCUMENTS

| WO | 2013148476 A1 | 10/2013 |
|---|---|---|
| WO | 2013178057 A1 | 12/2013 |
| WO | 2014101778 A1 | 7/2014 |

OTHER PUBLICATIONS

PCT International Search Report mailed Jan. 3, 2013, issued in International Application No. PCT/CN2012/082036 (4 pages).
PCT International Search Report mailed Jan. 10, 2013, issued in International Application No. PCT/CN2012/082043 (4 pages).
PCT International Search Report mailed May 30, 2013, issued in International Application No. PCT/CN2013/071797 (4 pages).
PCT International Preliminary Report on Patentability mailed Aug. 26, 2014, issued in International Application No. PCT/CN2012/082025 (5 pages).
Database CA [Online] Chemical Abstracts Service, Jan. 26, 2006, Taisei Plas Co., Ltd., Japan: Composite Materials of Anodized Aluminum Alloys and Thermoplastic Resins, and Their Manufacture by Injection Molding, and Abstract for JP 2006-001216, Jan. 5, 2006 (3 pages).
Furneaux et al., "The Formation of Controlled-porosity Membranes from Anodically Oxidized Aluminum," Nature, vol. 337, No. 6203, Jan. 12, 1989, pp. 147-149.
Gong et al., "Electrochemical/chemical Synthesis of Nanostructured Arrays of Oxide Cones or Rings," Journal of Materials Chemistry. vol. 18, No. 15, Mar. 12, 2008, pp. 1741-1746.
Lee et al., "NanostructureDependent WaterDroplet Adhesiveness Change in Superhydrophobic Anodic Aluminum Oxide Surfaces: From Highly Adhesive to Self-Cleanable," Langmuir Letter, vol. 26, No. 3, Feb. 2, 2010, pp. 1412-1415, including Supporting Information, Dec. 29, 2009.
Extended European Search Report dated Sep. 25, 2015, issued in related European Patent Application No. EP12869418.9 (7 pages).
Extended European Search Report dated Sep. 25, 2015, issued in related European Patent Application No. EP12869214.2 (6 pages).
PCT International Preliminary Report on Patentability dated Aug. 26, 2014, issued in related International Application No. PCT/CN2012/078830 (5 pages).
PCT International Preliminary Report on Patentability dated Aug. 26, 2014, issued in related International Application No. PCT/CN2012/078832 (5 pages).
PCT International Preliminary Report on Patentability dated Aug. 26, 2014, issued in related International Application No. PCT/CN2012/082029 (5 pages).
PCT International Preliminary Report on Patentability dated Aug. 26, 2014, issued in related International Application No. PCT/CN2012/082043 (5 pages).
PCT International Preliminary Report on Patentability dated Aug. 26, 2014, issued in related International Application No. PCT/CN2013/071797 (7 pages).
PCT International Preliminary Report on Patentability dated Aug. 26, 2014. issued in related International Application No. PCT/CN2012/082031 (5 pages).
PCT International Search Report and Written Opinion dated Mar. 27, 2014, issued in related International Application No. PCT/CN2013/090471 (13 pages).
PCT International Search Report and Written Opinion dated Sep. 5, 2013, issued in related International Application No. PCT/CN2013/076351 (12 pages).
Non-Final Office Action dated May 24, 2016, issued in related U.S. Appl. No. 14/466,906 (11 pages).
Non-Final Office Action dated Feb. 18, 2016, issued in related U.S. Appl. No. 14/466,927 (15 pages).
Non-Final Office Action dated Apr. 8, 2016, issued in related U.S. Appl. No. 14/466,932 (9 pages).
Final Office Action dated Jun. 20, 2016, issued in related U.S. Appl. No. 14/466,932 (10 pages).
Non-Final Office Action dated Aug. 17, 2016, issued in related U.S. Appl. No. 14/466,873 (15 pages).
Final Office Action dated Jul. 21, 2016, issued in related U.S. Appl. No. 14/466,927 (13 pages).
Non-Final Office Action dated Sep. 20, 2016, issued in related U.S. Appl. No. 14/466,932 (17 pages).
Non-Final Office Action dated Aug. 3, 2016, issued in related U.S. Appl. No. 14/466,937 (14 pages).
Non-Final Office Action for U.S. Appl. No. 14/466,853, mailed on Sep. 30, 2016, (12 pages).
Non-Final Office Action for U.S. Appl. No. 14/466,363, mailed on Oct. 18, 2016 (12 pages).

\* cited by examiner

METAL-RESIN COMPOSITE AND METHOD FOR PRODUCING THE SAME

CROSS-REFERENCE TO RELATED APPLICATION

This application is a continuation of International Patent Application No. PCT/CN2012/082025, filed Sep. 26, 2012, which claims priority to and benefits of Chinese Patent Application Serial No. 201210043637.X, filed with the State Intellectual Property Office of P. R. China on Feb. 24, 2012. The entire content of the above applications is incorporated herein by reference.

FIELD

The present disclosure relates to the field of metal-plastic integrally molding, and more particularly to a method for producing a composite of a metal and a resin, and a metal-resin composite obtained by the same.

BACKGROUND

In manufacturing articles, such as automobiles, household appliances and industrial machines, a metal and a resin often need to be firmly bonded together. In conventional methods, an adhesive may be used at normal temperature or under heating to integrally bond a metal and a synthetic resin. Alternatively, a resin may be bonded to a magnesium alloy, an aluminum alloy, or ferroalloys such as stainless steel directly without an adhesive.

Nano molding technology (NMT) is a technique of integrally bonding a metal and a resin, and allows the resin to be directly injection molded on a surface of a metal sheet by nano molding the surface of the metal sheet so as to obtain a metal-resin integrally molded product. For effective bonding of a metal and a resin, NMT may replace commonly used insert molding or zinc-aluminum or magnesium-aluminum die casting so as to provide a metal-resin integrally molded product with low cost and high performance. Compared with other bonding technologies, NMT may reduce the weight of the final product, may ensure excellent strength of the mechanical structure, high processing rate, high output, and allows more appearance decoration methods, consequently applicable to vehicles, IT equipment, and 3C products.

Japan Taisei Plas Co., Ltd. filed a series of patent applications, for example, CN1492804A, CN1717323A, CN101341023A and CN101631671A, which propose a method for integrally molding a metal and a resin composition. In this method, by using a resin composition containing polyphenylene sulfide (PPS), polybutylene terephthalate (PBT) and polyamide (PA) with high crystallinity as an injection molding material, the resin composition is directly injection molded on a surface of a nano molded aluminum alloy layer to allow the resin composition to immerse in a nanoscale micropore (i.e., nanopore), so as to obtain a metal-resin integrally molded product with a certain mechanical strength. However, because the resins used in this method are all highly crystalline resins, the molding process requries a longer cooling time and a narrow range of mold temperature in the course of molding to ensure modeling performance. In addition, the highly crystalline resins often make the plastic surface hard to process, resulting in significant variations of the appearance among the finish products.

SUMMARY

Embodiments of the present disclosure seek to solve at least one of the problems existing in the prior art, particularly the problems of complex molding process, inflexible conditions, the fact that the surface of the plastic layer is difficult to process, variations in the surface decoration of a plastic article, and low mechanical strength when the plastic is a highly crystalline resin in nano molding technology (NMT).

According to a first aspect of the present disclosure, there is provided a method for producing a composite of a metal and a resin. The method comprises:

A) forming nanopores on at least a part of the surface of a metal; and

B) injection molding a thermoplastic resin directly on the surface of the metal, wherein the thermoplastic resin includes a main resin and a polyolefin resin, the main resin includes a mixture of polyphenylene ether and polyphenylene sulfide, and the polyolefin resin has a melting point of about 65° C. to about 105° C.

According to a second aspect of the present disclosure, there is provided a metal-resin composite, which is obtained by the method according to the first aspect of the present disclosure.

According to a third aspect of the present disclosure, there is provided a metal-resin composite comprising: a metal part; a plastic part made of a resin; an oxide layer formed between the metal part and the plastic part, wherein the oxide layer includes corrosion pores on the surface contacting the plastic part, and nanopores on the surface contacting the metal part; the nanopores have an average diameter of about 10 nm to about 100 nm and an average depth of about 0.5 μm to about 9.5 μm, and the corrosion pores have an average diameter of about 200 nm to about 2000 nm and an average depths of about 0.5 μm to about 9.5 μm; a part of the corrosion pores are communicated with a part of the nanopores; and a part of the resin is filled in the nanopores and corrosion pores.

According to an embodiment of the present disclosure, a non-crystalline resin is used for the resin part. The non-crystalline resin has good surface gloss and good toughness namely. The non-crystalline resin may include a mixture of polyphenylene ether and polyphenylene sulfide, and may further include a polyolefin resin with a melting point of about 65° C. to about 105° C. Therefore, injection molding at a specific mould temperature may not be required during the molding. Subsequent annealing treatment may also not be required. The molding process may be simplified. And it may be ensured that the obtained metal-resin composite has high mechanical strength and good surface treatment characteristics, thus providing a wide range of applications for surface decoration of a plastic article, and meeting the diverse requirements of customers.

Additional aspects and advantages of embodiments of present disclosure will be given in part in the following descriptions, become apparent in part from the following descriptions, or be learned from the practice of the embodiments of the present disclosure.

DETAILED DESCRIPTION

Reference will be made in detail to embodiments of the present disclosure. The embodiments described herein are explanatory, illustrative, and used to generally understand the present disclosure. The embodiments shall not be construed to limit the present disclosure.

According to a first aspect of the present disclosure, a method for producing a composite of a metal and a resin is provided. The method comprises:

A) forming nanopores on at least a part of the surface of a metal sheet; and

B) injection molding a thermoplastic resin directly on the surface of the metal sheet.

The thermoplastic resin includes a main resin and a polyolefin resin, the main resin includes a mixture of polyphenylene ether and polyphenylene sulfide, and the polyolefin resin has a melting point of about 65° C. to about 105° C.

Because the resins used in the prior art are all highly crystalline resins, the surface of the plastic layer may be difficult to treat or process. In the present disclosure, however a non-crystalline resin, which has a high surface gloss and a high toughness, both superior to those of the highly crystalline resins in the prior art, is used as an injection molding material. A polyolefin resin with a melting point of about 65° C. to about 105° C. may also be used. Therefore, injection molding at a specific mould temperature may not be required during the molding. Subsequent annealing treatment may also not be required. The molding process may be simplified. And it may be ensured that the obtained metal-resin composite has a high mechanical strength and good surface treatment characteristics, thus providing a wide range of applications for surface decoration of a plastic article and meeting the diverse requirements of customers.

In the present disclosure, the mechanism of the metal-resin integrally molding is as follows: nanoscale micropores (i.e., nanopores) are formed on the surface of the metal sheet. A resin composition is melted on the surface of the metal sheet. Accordingly, a part of the melted resin composition permeates into the nanopores. And then the metal and the resin composition are integrally injection molded.

Particularly, in step A), forming nanopores in a surface of a metal sheet comprises: anodizing at least a part of the surface of the metal to form an oxide layer having the nanopores thereon. The anodizing technique may be known to those skilled in the art.

In some embodiments, anodizing the surface of the metal sheet may comprise: placing the metal sheet as an anode in a $H_2SO_4$ solution with a concentration of about 10 wt % to about 30 wt %; and electrolyzing the metal sheet at a temperature of about 10° C. to about 30° C. at a voltage of about 10V to about 100V for about 1 minute to about 40 minutes to form the oxide layer with a thickness of about 1 m to about 10 μm on at least a part of the surface of the metal. An anodizing apparatus may be a well-known anodizing apparatus, for example, an anodizing bath.

By anodizing, the oxide layer formed with the nanopores is formed on the surface of the metal sheet. Preferably, the oxide layer has a thickness of about 1 μm to about 10 μm, more preferably about 1 μm to about 5 μm.

The nanopores preferably have an average diameter of about 10 nm to about 100 nm. Alternatively, the nanopores may have an average diameter of about 20 nm to about 80 nm. Still alternatively, the nanopores may have an average diameter of about 20 nm to about 60 nm. The nanopores may have an average depth of about 0.5 μm to about 9.5 μm. Alternatively, the nanopores may have an average depth of about 0.5 μm to about 5 μm. The structure of the nanopores may improve the filling of the melted resin composition in the nanopores, and ensure that the nanopores are filled with the melted resin in a conventional injection molding process, which does not reduce the joining area between the resin and the oxide layer and may further improve the bonding force between the resin and the metal because there are no voids or gaps in the nanopores.

In one embodiment, in step A), forming nanopores in a surface of a metal sheet may further comprise: immersing the metal sheet having the oxide layer on the surface thereof in an etching solution to form corrosion pores on an outer surface of the oxide layer. At least a part of the corrosion pores are communicated with the nanopores. By a double-layer three-dimensional pore structure formed by the corrosion pores and the nanopores, the permeability of the resin composition may be further enhanced, and the bonding force between the resin composition and the metal sheet may be improved, thus further facilitating the molding.

The corrosion pores preferably have an average diameter of about 200 nm to about 2000 nm. Alternatively, the corrosion pores may have an average diameter of about 200 nm to about 1000 nm. Still alternatively, the corrosion pores may have an average diameter of about 400 nm to about 1000 nm. The corrosion pores have an average depth of about 0.5 μm to about 9.5 μm. Alternatively, the corrosion pores may have an average depth of about 0.5 μm to about 5 μm. The structure of the corrosion pores may facilitate direct injection of the resin composition and the bonding between the resin composition and the metal sheet during the injection molding.

The etching solution may include any solution which may corrode the oxide layer. Generally, the etching solution may include a solution that may dissolve the oxide layer and have a concentration as desired. For example, the etching solution may be an acid base etching solution. Preferably, the etching solution may be a single basic solution with a pH of about 10 to about 13 or a complex buffer solution.

The single basic solution with a pH of about 10 to about 13 may include at least one selected from the group of a $Na_2CO_3$ aqueous solution, a $NaHCO_3$ aqueous solution and a NaOH aqueous solution, preferably a $Na_2CO_3$ aqueous solution and/or a $NaHCO_3$ aqueous solution, thus allowing the corrosion pores to be uniformly distributed on the surface of the oxide layer and to have uniform diameters, and achieving better bonding performance between the resin layer and an aluminum alloy substrate as well as higher tensile strength and better integral bonding of the composite structure. The $Na_2CO_3$ aqueous solution and/or the $NaHCO_3$ aqueous solution may have a solid content of about 0.1 wt % to about 15 wt %. The complex buffer solution may be a mixed solution of a soluble hydrophosphate and a soluble base. For example, the complex buffer solution may be an aqueous solution of sodium dihydrogen phosphate and sodium hydroxide. The aqueous solution of sodium dihydrogen phosphate and sodium hydroxide may have a solid content of about 0.1 wt % to about 15 wt %.

Immersing the metal sheet with the oxide layer in an etching solution may comprise repeatedly immersing the metal sheet in the etching solution for 2 times to 10 times, with each immersing lasting for about 1 minute to about 60 minutes, and cleaning the metal sheet with deionized water after each immersing. Cleaning the metal sheet may comprise washing the metal sheet for about 1 minute to about 5 minutes, or placing the metal sheet in a washing bath for about 1 minute to about 5 minutes.

In the present disclosure, by using a polyolefin resin with a melting point of about 65° C. to about 105° C. in the non-crystalline main resin, the flowing capability of the resin in the nanopores on the surface of the metal sheet may be enhanced, thus ensuring strong adhesive force between the metal and the plastic as well as high mechanical strength of the metal-resin composite. Preferably, based on 100 weight parts of the thermoplastic resin, the amount of the main resin is about 70 weight parts to about 95 weight parts, and the amount of the polyolefin resin is about 5 weight parts to about 30 weight parts.

It has also been found by the inventors that the flowing capability of the resin may be enhanced by the inclusion of a flow improver in the thermoplastic resin, thus further enhancing the adhesive force between the metal and the plastic as well as the injection molding performance of the resin. Preferably, based on 100 weight parts of the thermoplastic resin, the thermoplastic resin may comprise about 1 weight part to about 5 weight parts of a flow improver.

Preferably, the flow improver includes a cyclic polycarbonate.

It has also been found by the inventors that including fiberglass in the thermoplastic resin may reduce contractibility rate of the plastics. Preferably, based on 100 weight parts of the thermoplastic resin, the thermoplastic resin may comprise 10-30 weight parts of fiberglass.

As mentioned above, in the present disclosure, the main resin includes a non-crystalline resin. Specifically, the main resin includes a mixture of polyphenylene ether (PPO) and polyphenylene sulfide (PPS). In an embodiment, a weight ratio of the PPO and the PPS is about 3:1 to about 1:3. In another embodiment, the weight ratio of the PPO and the PPS about is 2:1-1:1.

In the present disclosure, the polyolefin resin has a melting point of about 65° C. to about 105° C. Preferably, the polyolefin resin may be a grafted polyethylene. More preferably, the polyolefin resin may be a grafted polyethylene with melting point of about 100° C. or about 105° C.

In the present disclosure, the metal sheet may be any metal commonly used in the prior art, and may be properly selected according to the application. For example, the metal sheet may be selected from the group of at least aluminum, stainless steel and magnesium.

According to a second aspect of the present disclosure, a metal-resin composite is also provided, which is obtained by the method according to the first aspect of the present disclosure.

According to a third aspect of the present disclosure, there is provided a metal-resin composite comprising: a metal part; a plastic part made of a resin; an oxide layer formed between the metal part and the plastic part, wherein the oxide layer includes corrosion pores on the surface contacting the plastic part, and nanopores on the surface contacting the metal part; the nanopores have an average diameter of about 10 nm to about 100 nm and an average depth of about 0.5 µm to about 9.5 µm, and the corrosion pores have an average diameter of about 200 nm to about 2000 nm and an average depth of about 0.5 µm to about 9.5 µm; a part of the corrosion pores are communicated with a part of the nanopores; and a part of the resin is filled in the nanopores and corrosion pores.

In the metal-resin composite according to an embodiment of the present disclosure, the metal sheet and the plastic layer are of an integrally formed structure, which has strong bonding force and high mechanical strength. As shown in Table 1, each metal-resin composite has a fracture strength of about 19 MPa to about 22 MPa, and an impact strength of about 270 J/m to about 350 J/m.

In order to further describe the technical problem, the technical solution, and the advantageous effects of the present disclosure, additional embodiments will be further described below in details with reference to examples thereof. It would be appreciated that particular examples described herein are merely used to understand the present disclosure. The examples shall not be construed to limit the present disclosure. The raw materials used in the examples and the comparative examples are all commercially available, without special limits.

Example 1

(1) Pretreatment:

A commercially available A5052 aluminum alloy plate with a thickness of 1 mm was cut into 18 mm×45 mm rectangular sheets, which were then immersed in a 40 g/L NaOH aqueous solution. The temperature of the NaOH aqueous solution was 40° C. After 1 minute, the rectangular sheets were washed with water and dried to obtain pretreated aluminum alloy sheets.

(2) Surface Treatment 1:

Each aluminum alloy sheet as an anode was placed in an anodizing bath including a 20 wt % $H_2SO_4$ solution. The aluminum alloy was electrolyzed at a voltage of 20V at 18° C. for 10 minutes, and then was blow-dried.

The cross section of the aluminum alloy sheet after the surface treatment 1 was observed by a metalloscope, showing that an aluminum oxide layer with a thickness of 5 µm was formed on the surface of the electrolyzed aluminum alloy sheet. The surface of the aluminum alloy sheet after the surface treatment 1 was observed by an electron microscope, showing that nanopores with an average diameter of about 40 nm to about 60 nm and a depth of 1 µm was formed in the aluminum oxide layer.

(3) Surface Treatment 2:

500 ml of 10 wt % sodium carbonate solution (pH=12) with a temperature of 20° C. was prepared in a beaker. The aluminum alloy sheet after step (2) was immersed in the sodium carbonate solution, taken out after 5 minutes, and placed in a beaker including water to be immersed for 1 minute. The process was repeated for 5 times. After water immersing for the last time, the aluminum alloy sheet was blow dried.

The surface of the aluminum alloy sheet after the surface treatment 2 was observed by an electron microscope, showing that corrosion pores with an average diameter of 300 nm to 1000 nm and a depth of 4 µm were formed in the surface of the immersed aluminum alloy sheet. It may also be observed that there was a double-layer three-dimensional pore structure in the aluminum oxide layer, and the corrosion pores were communicated with the nanopores.

(4) Molding:

46 weight parts polyphenylene ether (PPO) (ZhongLanChenGuang PPO LXR040), 23 weight parts polyphenylene sulfide (PPS) (SiChuanDeYang PPS-HCl), 3 weight parts fluidity improver cyclic polycarbonate (CBT100), 8 weight parts grafted polyethylene having a melting point of 65° C. (Arkema Lotader AX8900), and 20 weight parts fiberglass (ZheJiangJuShi 988A) are weighed and mixed uniformly to obtain a resin mixture. Then, using the injection molding machine described herein, the melted resin mixture was injection molded on the surface of the aluminum alloy sheet after step (3), to obtain a metal-resin composite S1 in this example.

Example 2

A metal-resin composite S2 in this example was prepared by a method which is substantially the same as the method in Example 1, with the following exceptions.

In step (1), instead of the aluminum alloy plate in Example 1, a commercially available magnesium alloy plate with a thickness of 3 mm was cut into 18 mm×45 mm rectangular sheets.

In step (2), each magnesium alloy sheet as an anode was placed in an anodizing bath including a 20 wt % $H_2SO_4$ solution, the magnesium alloy was electrolyzed at a voltage of 15V at 18° C. for 10 min, and then the magnesium alloy sheet was blow dried.

The cross section of the magnesium alloy sheet after the surface treatment 1 was observed by a metalloscope, showing that a magnesium oxide layer with a thickness of 5 μm was formed on the surface of the electrolyzed magnesium alloy sheet. The surface of the magnesium alloy sheet after the surface treatment 1 was observed by an electron microscope, showing that nanopores with an average diameter of 20 nm to 40 nm and a depth of 1 μm were formed in the magnesium oxide layer.

The surface of the magnesium alloy sheet after the surface treatment 2 was observed by an electron microscope, showing that corrosion pores with an average diameter of 300 nm to 1000 nm and a depth of 4 μm were formed on the surface of the immersed magnesium alloy sheet. It may also be observed that there was a double-layer three-dimensional pore structure in the magnesium oxide layer, and the corrosion pores were communicated with the nanopores.

After the above steps, the metal-resin composite S2 in this example was obtained.

Example 3

A metal-resin composite S3 in this example was prepared by a method which was substantially the same as the method in Example 1, with the following exceptions.

In step (2), each aluminum alloy sheet as an anode was placed in an anodizing bath including a 20 wt % $H_2SO_4$ solution, the aluminum alloy was electrolyzed at a voltage of 40V at 18° C. for 10 min, and then the aluminum alloy sheet was blow dried.

The cross section of the aluminum alloy sheet after the surface treatment 1 was observed by a metalloscope, showing that an aluminum oxide layer with a thickness of 5 μm was formed on the surface of the electrolyzed aluminum alloy sheet. The surface of the aluminum alloy sheet after the surface treatment 1 was observed by an electron microscope, showing that nanopores with an average diameter of 60 nm to 80 nm and a depth of 1 μm was formed in the aluminum oxide layer.

The surface of the aluminum alloy sheet after the surface treatment 2 was observed by an electron microscope, showing that corrosion pores with an average diameter of 300 nm to 1000 nm and a depth of 4 μm were formed on the surface of the immersed aluminum alloy sheet. It may also be observed that there was a double-layer three-dimensional pore structure in the aluminum oxide layer, and the corrosion pores were communicated with the nanopores.

After the above steps, the metal-resin composite S3 in this example was obtained.

Example 4

A metal-resin composite S4 in this example was prepared by a method which is substantially the same as the method in Example 1, with the following exceptions.

In step (4), 35 weight parts polyphenylene ether (PPO) (ZhongLanChenGuang PPO LXR040), 35 weight parts polyphenylene sulfide (PPS) (SiChuanDeYang PPS-HCl), 10 weight parts fluidity improver epoxide oligoester (CBT100), 8 weight parts grafted polyethylene having a melting point of 105° C. (Arkema Lotader AX8900), and 20 weight parts fiberglass (ZheJiangJuShi 988A) were weighed, Then, using an injection molding machine, the melted resin mixture was injection molded on the surface of the aluminum alloy sheet after step (3), to obtain a metal-resin composite S4 in this example.

Example 5

A metal-resin composite S5 in this example was prepared by a method which was substantially the same as the method in Example 2, with the following exceptions.

In step (4), 59 weight parts polyphenylene ether (PPO) (ZhongLanChenGuang PPO LXR040), 30 weight parts polyphenylene sulfide (PPS) (SiChuanDeYang PPS-HCL), 3 weight parts fluidity improver epoxide oligoester (CBT100), and 8 weight parts grafted polyethylene having a melting point of 65° C. (Arkema Lotader AX8900) were weighed, and a resin mixture was obtained after even mixing. Then, using an injection molding machine, the melted resin mixture was injection molded on the surface of the aluminum alloy sheet after step (3), to obtain a metal-resin composite S5 in this example.

Comparative Example 1

A metal-resin composite DS1 in this example was prepared by a method which was substantially the same as the method in Example 1, with the following exceptions.

In step (4), 51 weight parts polyphenylene ether (PPO) (ZhongLanChenGuang PPO LXR040), 26 weight parts polyphenylene sulfide (PPS) (SiChuanDeYang PPS-HCL), 3 weight parts fluidity improver epoxide oligoester (CBT100) and 20 weight parts fiberglass (ZheJiangJuShi 988A) were weighed, and a resin mixture was obtained after even mixing. Then, using an injection molding machine, the melted resin mixture was injection molded on the surface of the aluminum alloy sheet after step (3), to obtain a metal-resin composite DS1 in this example.

Comparative Example 2

A metal-resin composite DS2 in this example was prepared by a method which was substantially the same as the method in Example 1, with the following exceptions.

In step (4), 89 weight parts polyphenylene sulfide (PPS) (SiChuanDeYang PPS-HCL), 3 weight parts fluidity improver epoxide oligoester (CBT100) and 8 weight parts grafted polyethylene having a melting point of 105° C. (Arkema Lotader AX8900), and a resin mixture was obtained after even mixing. Then, using an injection molding machine, the melted resin mixture was injection molded on the surface of the aluminum alloy sheet after step (3), to obtain a metal-resin composite DS2 in this example.

Comparative Example 3

A metal-resin composite DS3 in this example was prepared by a method which was substantially the same as the method in Example 1, with the following exceptions.

In step (4), 91 weight parts polyphenylene sulfide (PPS) (SiChuanDeYang PPS-HCL), 3 weight parts fluidity improver epoxide oligoester (CBT100) and 8 weight parts grafted polyethylene having a melting point of 105° C. (Arkema Lotader AX8900) were weighed, and a resin mixture was obtained after even mixing. Then, using an injection molding machine, the melted resin mixture was injection molded on the surface of the aluminum alloy sheet after step (3), and the entire article was subjected to anneal treatment at 180° C. for 1 hour, to obtain a metal-resin composite DS3 in this example.

Comparative Example 4

A metal-resin composite DS4 in this example was prepared by a method which was substantially the same as the method in Example 1, with the following exceptions.

In step (4), 84 weight parts polyphenylene sulfide (PPS) (SiChuanDeYang PPS-HCL), 3 weight parts fluidity improver epoxide oligoester (CBT100), 8 weight parts grafted polyethylene having a melting point of 105° C. (Arkema Lotader AX8900) and 5 weight parts flexibilizer (Arkema Lotader AX8840) were weighed, and a resin mixture was obtained after even mixing. Then, using an injection molding machine, the melted resin mixture was injection molded on the surface of the aluminum alloy sheet after step (3), and the entire article was subjected to anneal treatment at 180° C. for 1 hour, to obtain a metal-resin composite DS4 in this example.

Performance Test

1) The metal-resin composites S1-S4 and DS1-DS4 were fixed on a universal testing machine for tensile test to obtain maximum loads thereof respectively. The test results were shown in Table 1.

2) The impact strength of standard samples of the metal-resin composites S1-S4 and DS1-DS4 was tested using a cantilever beam impact tester according to the method disclosed in ASTM D256.

The test results were shown in Table 1.

TABLE 1

| Samples | Fracture Strength (MPa) | Impact Strength (J/m) | Samples | Breaking Tenacity (MPa) | Impact Strength (J/m) |
|---|---|---|---|---|---|
| S1 | 22 | 270 | S2 | 20 | 270 |
| S3 | 20 | 270 | S4 | 19 | 310 |
| S5 | 19 | 350 | | | |
| DS1 | 10 | 230 | DS2 | 12 | 90 |
| DS3 | 21 | 90 | DS4 | 20 | 130 |

It may be seen from the test results in Table 1 that the metal-resin composites S1-S5 have a fracture strength of 19-22 MPa, which indicates that the bonding force between the metal sheet and the plastic layer in the metal-resin composites S1-S5 is very strong. And the metal-resin composites S1-S5 have an impact strength of 270-350 J/m, which indicates that the metal-resin composites S1-S5 have high mechanical strength.

By comparing the test results of the metal-resin composite 51 with the test results of the metal-resin composites DS3 and DS4, it may be seen that the toughness of the polyphenylene oxide resin used in the prior art is very poor. The toughness of the conventional resin remains poor even after modified with a toughener.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for producing a composite of a metal and a resin, comprising:
   A) forming nanopores on at least a part of a surface of a metal sheet; and
   B) injection molding a thermoplastic resin directly on the surface of the metal sheet, wherein the thermoplastic resin includes a main resin and a polyolefin resin, the main resin includes a mixture of polyphenylene ether and polyphenylene sulfide, and the polyolefin resin has a melting point of about 65° C. to about 105° C.,
   wherein forming the nanopores comprises anodizing at least a part of the surface of the metal sheet to form an oxide layer having the nanopores thereon, and immersing the metal sheet having the oxide layer on the surface thereof in an etching solution to form corrosion pores on an outer surface of the oxide layer to form a double-layer pore structure including the corrosion pores having diameters of about 200 nm to about 2000 nm and the nanopores having an average diameter of about 10 nm to about 100 nm, wherein the corrosion pores are in communication with the nanopores.

2. The method according to claim 1, wherein the oxide layer has a thickness of about 1 μm to about 10 μm, and the nanopores have an average depth of about 0.5 μm to about 9.5 μm.

3. The method according to claim 1, wherein the anodizing comprises:
   placing the metal sheet as an anode in a $H_2SO_4$ solution with a concentration of about 10 wt % to about 30 wt %; and
   electrolyzing the metal sheet at a temperature of about 10° C. to about 30° C. at a voltage of about 10V to about 100V for about 1 minute to about 40 minutes to form the oxide layer with a thickness of about 1 μm to about 10 μm on at least a part of the surface of the metal sheet.

4. The method according to claim 1, wherein the corrosion pores have depths of about 0.5 μm to about 9.5 μm.

5. The method according to claim 1, wherein the etching solution corrodes the oxide layer.

6. The method according to claim 1, wherein based on 100 weight parts of the thermoplastic resin, the amount of the main resin is about 70 weight parts to about 95 weight parts, and the amount of the polyolefin resin is about 5 weight part to about 30 weight parts.

7. The method according to claim 6, wherein the thermoplastic resin further includes a flow improver, and based on 100 weight parts of the thermoplastic resin, the amount of the flow improver is about 1 weight part to about 5 weight parts, and wherein the flow improver includes a cyclic polyester.

8. The method according to claim 6, wherein the thermoplastic resin further includes a fiberglass, and based on 100 weight parts of the thermoplastic resin, the amount of the fiberglass is about 1 weight part to about 30 weight parts.

9. The method according to claim 1, wherein the weight ratio of polyphenylene ether and polyphenylene sulfide in the main resin is about 3:1 to about 1:3.

10. The method according to claim 1, wherein the polyolefin resin includes a grafted polyethylene.

11. The method according to claim 1, wherein the metal sheet includes at least one selected from a group of aluminum, stainless steel and magnesium.

12. A method for producing a composite of a metal and a resin, comprising:

A) forming nanopores on at least a part of a surface of a metal sheet by anodizing at least the part of the surface of the metal sheet to form an oxide layer having the nanopores thereon;
B) immersing the metal sheet having the oxide layer on the surface thereof in an etching solution to form corrosion pores on an outer surface of the oxide layer; and
C) injection molding a thermoplastic resin directly on the oxide layer of the metal sheet, wherein the thermoplastic resin includes a main resin and a polyolefin resin, the main resin includes a mixture of polyphenylene ether and polyphenylene sulfide, and the polyolefin resin has a melting point of about 65° C. to about 105° C.,
wherein the nanopores and the corrosion pores form a double-layer pore structure, the nanopores have an average diameter of about 10 nm to about 100 nm and the corrosion pores have an average diameter of about 200 nm to about 2000 nm, wherein the corrosion pores are in communication with the nanopores.

\* \* \* \* \*